(12) United States Patent
McCalley

(10) Patent No.: US 7,413,199 B2
(45) Date of Patent: Aug. 19, 2008

(54) COLLAPSIBLE WHEEL ASSEMBLY

(75) Inventor: Stephen McCalley, Langhorne, PA (US)

(73) Assignee: Pinnacle Products International, Inc., Yardley, PA (US)

( * ) Notice: Subject to any disclaimer, the term of this patent is extended or adjusted under 35 U.S.C. 154(b) by 0 days.

(21) Appl. No.: 11/590,279

(22) Filed: Oct. 30, 2006

(65) Prior Publication Data

US 2008/0100011 A1     May 1, 2008

(51) Int. Cl.
*B62B 3/00*     (2006.01)
(52) U.S. Cl. .............................. 280/63; 280/38; 280/43; 280/641
(58) Field of Classification Search .................. 280/38, 280/43, 43.13, 43.16, 63, 641, 651, 652, 280/654, DIG. 6; 301/1, 113, 120, 128
See application file for complete search history.

(56) References Cited

U.S. PATENT DOCUMENTS

| | | | | | |
|---|---|---|---|---|---|
| 3,953,045 | A | * | 4/1976 | Feret, Jr. ...................... | 280/638 |
| 4,550,930 | A | * | 11/1985 | Proffit ........................ | 280/655 |
| 5,465,844 | A | * | 11/1995 | Lee ............................. | 206/515 |
| 2004/0119262 | A1 | * | 6/2004 | Stout ........................ | 280/415.1 |
| 2005/0012307 | A1 | * | 1/2005 | Shapiro ...................... | 280/651 |
| 2006/0027999 | A1 | * | 2/2006 | Hardin et al. ............... | 280/646 |

* cited by examiner

*Primary Examiner*—Christopher Ellis
*Assistant Examiner*—Katy Meyer
(74) *Attorney, Agent, or Firm*—Volpe and Koenig P.C.

(57) ABSTRACT

A wheel assembly and a method of using the wheel assembly are provided. The wheel assembly is attachable to various objects and capable of quickly and easily collapsing or folding to become more compact for more efficient and cost-effective transportation or shipping. It is then capable of being quickly and easily expanded.

12 Claims, 5 Drawing Sheets

COLLAPSIBLE WHEEL ASSEMBLY

FIELD OF INVENTION

The present invention is in the field of wheel assemblies for transporting products. More particularly, the invention is directed to a wheel assembly that is capable of quickly and easily collapsing or folding and thus, becoming more compact for more efficient and cost-effective transportation or shipping.

BACKGROUND

Wheel assemblies are secured to various types of products to allow the products to be more easily and conveniently transported. Wheeling is generally a more effective means of transporting a product than other means such as carrying, especially when the product is large or heavy. Many wheel assemblies include a rigid base, an axle fixed to the base and wheels positioned along the axle. The axle is rigid; often a single steel bar or stub axles welded or rigidly fixed on opposite sides of the product. The wheels are generally located at fixed positions along the axle; typically at the axle's opposite ends. The axle and wheels must extend sufficiently beyond the product's boundaries to provide a stable base and be sufficiently designed to support a heavy load when the product is wheeled.

The known axle-wheel arrangement typically makes the product larger and heavier, and therefore, more costly for the manufacturer or distributor to package and transport. To reduce size for shipping, wheel assemblies are often completely removed before shipping, shipped separately, and then reattached when the product and wheel assemblies arrive. This is time consuming, costly and sometimes, detaching and reattaching the wheel assembly damages the product. Even if it is desirable to detach and reattach the wheel assembly, it is still adds cost and expense.

There is a need for a cost-effective wheel assembly that can be used in connection with products designed to support large and/or heavy loads and that can be quickly and easily transformed to a more compact arrangement for packaging, shipping or transporting both while attached to the product or when detached. There is also a need for a wheel assembly that can be quickly and easily expanded, from the compact arrangement to a use position, as necessary, to efficiently wheel the product, for example, when the product reaches its final destination.

SUMMARY

The present invention is directed to a collapsible wheel assembly comprising: a base; a plurality of wheels; a plurality of axles having opposite first and second ends, each of the axles pivotally connected to the base; and each of the axles having at least one of the wheels located thereon such that the wheels are respectively slideable along a length of an associated one of the axles.

In another embodiment, present invention provides a collapsible wheel assembly comprising; a base having opposite first and second faces; a plurality of wheels; a plurality of axles having opposite first and second ends, the second end of each of the axles is pivotally connected to the second face of the base; each of the axles having at least one of the wheels located thereon adjacent the respective first ends of the axles such that the wheels are respectively slideable along a length of an associated one of the axles; and an object attached to the first face of the base.

The present invention also provides a method of using the aforementioned collapsible wheel assemblies, with the method comprising: rotating the axles about the pivotal connections away from the base; and sliding the wheels along a length of the axles toward the base. With the wheels collapsed, the wheel assembly is more compact allowing it and the object to which it is attached to be transported or shipped in a more compact package, reducing cost.

The wheel assembly is easily expanded by pulling the wheels toward the first ends of the respective shafts and rotating the axles toward the base. The base is easily attachable to, and capable of supporting and allowing easy transport of many different objects, and is of particular use in connection with large, movable heaters and fans.

BRIEF DESCRIPTION OF THE DRAWINGS

The foregoing summary, as well as the following detailed description of the preferred embodiments of the invention will be better understood when read in conjunction with the appended drawings. For the purpose of illustrating the invention, there is shown in the drawings embodiments which are presently preferred. It should be understood, however, that the invention is not limited to the precise arrangement shown.

DETAILED DESCRIPTION OF THE PREFERRED EMBODIMENTS

Figure 1:
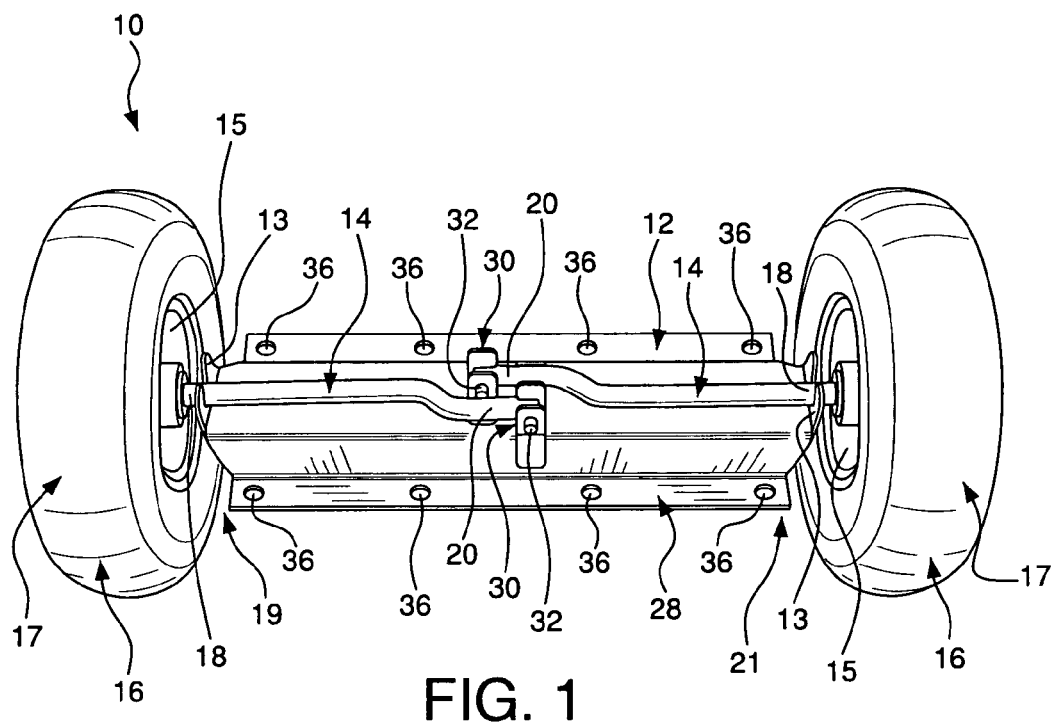
FIG. 1 is a perspective view of an embodiment of the wheel assembly of the present invention in the first or expanded use position.

FIGS. 1-6 show a preferred embodiment of a collapsible wheel assembly 10 of the present invention. The assembly 10 is comprised of a base 12, two shafts or axles 14 and two wheels 16. The base 12 is preferably rigid and comprised of metal such as steel or aluminum, or may be made of any other suitable material, such as a rigid composite of polymeric material. The axles 14 are also rigid, and are preferably comprised of steel or another suitable metal. The wheels 16 are comprised of a hub 15 surrounded by tires 17, which are preferably rubber but may be polymeric.

Figure 5:
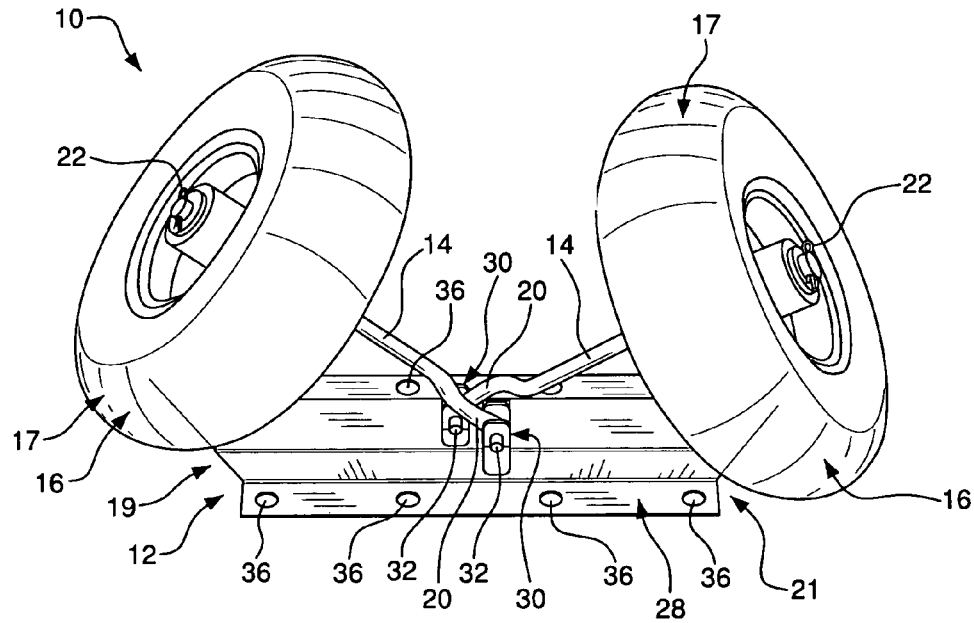
FIG. 5 is a perspective view of the wheel assembly shown in FIG. 1 in between the first or expanded use position and the second or folded position.
Figure 6:
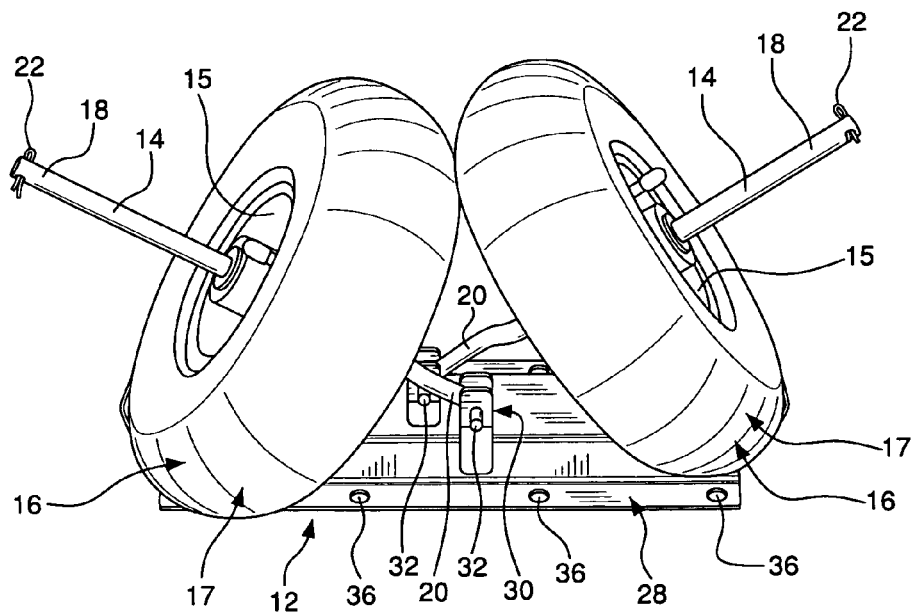
FIG. 6 is a perspective view of the wheel assembly shown in FIG. 1 in the second or folded position.

As shown in detail in FIGS. 1 and 6, the axles 14 each include a first end 18 and an oppositely-located second end 20 and extend through the wheel hubs 15. In the expanded position, shown in FIG. 1, the wheels 16 are located at the respective first ends 18 of the associated axles 14. As shown in detail in FIGS. 5 and 6, wheel pins 22, which may be a cotter pin or hair pin cotter or other suitable pin inserted through a hole in the first ends 18 of the axles 14, prevent the wheel hubs 15 from sliding off of the axles 14. The wheels 16 are free to rotate on the axles 14 allowing the wheel assembly 10 to roll backward and forward. The wheels 16 are also slideable along the axles 14.

Figure 4:
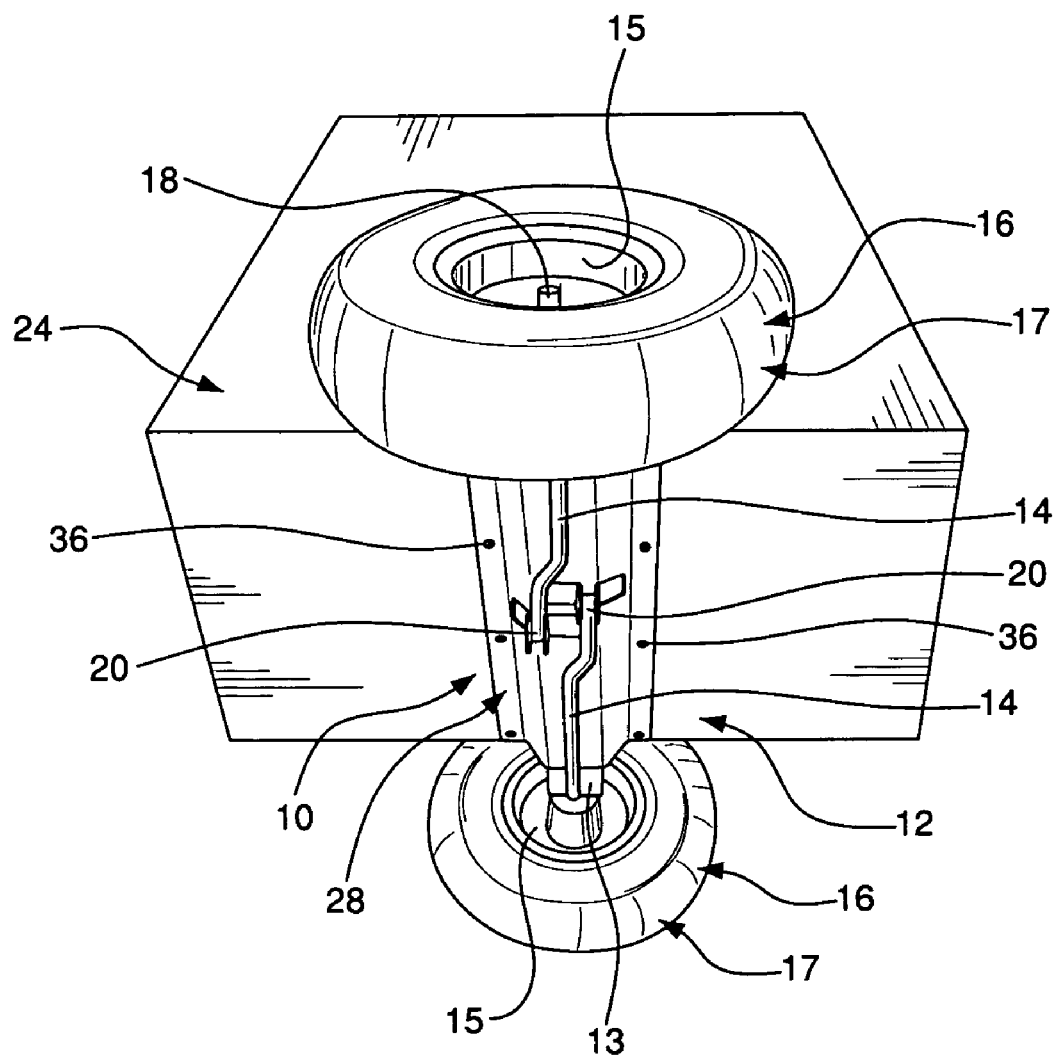
FIG. 4 is a perspective view of the wheel assembly shown in FIG. 1 secured to an object.

As shown in FIG. 1, mechanical interference between the wheel hubs 15 and flanges 13 on opposite first and second ends 19, 20 of the base 12 keep the wheels 16 from sliding inward; i.e., toward the second ends 20 of the axles 14. As shown in detail in FIG. 2, within each of the two the flanges 13 is a slot 34. These slots 34 are slightly larger than the diameter of the axles 14 but have protrusions 38 that extend within the slots 34 and mechanically interfere with the axles 14 when the assembly 10 is in the first or expanded position. Frictional force between the protrusions 38 and the axles 14 keeps the axles 14 snugly within the slots 34, which keeps the axles 14 in the expanded position. The fit is snug enough such that the axles 14 do not release from the grooves 34 unless forced out by a user. When an object 24 is wheeled on the assembly 10, as shown in FIG. 4, the weight of the object on the wheel assembly 10 also keeps the axles 14 in the expanded position.

Figure 2:
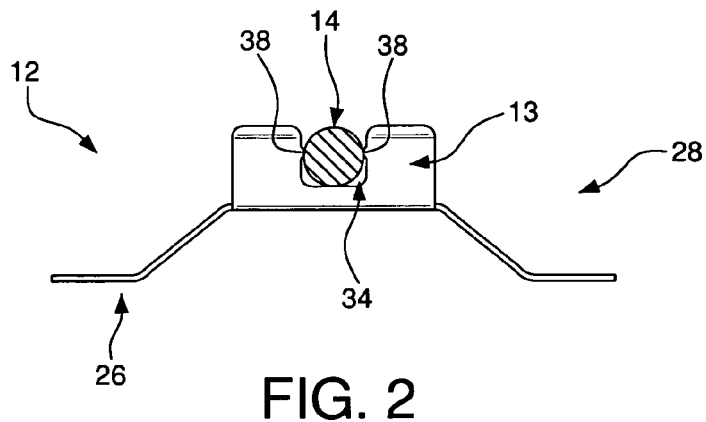
FIG. 2 is a side plan view of the wheel assembly shown in FIG. 1 with the wheels removed.

As shown in FIG. 2, the base 12 comprises a first or top face 26 and an oppositely located second or bottom face 28. As shown in FIG. 4, the top face 26 is secured to a product or object 24. As shown in FIGS. 1 and 4, the base preferably includes at least one slot or hole 36 and can be secured to the object by bolts, or screws through the object and the top face 26 of the base 12. Alternatively, the object 24 may be secured to the base 12 by welds, or by springs or clamps engaging with the object and the base 12. Alternatively, the top face 26 may include a groove or channel and the object 24 fits snugly within the groove or channel and is held to the top face 26 by friction between the object 24 and the walls of the groove or channel. Alternatively, the object 24 and the base 12 are formed as one piece.

Figure 3:
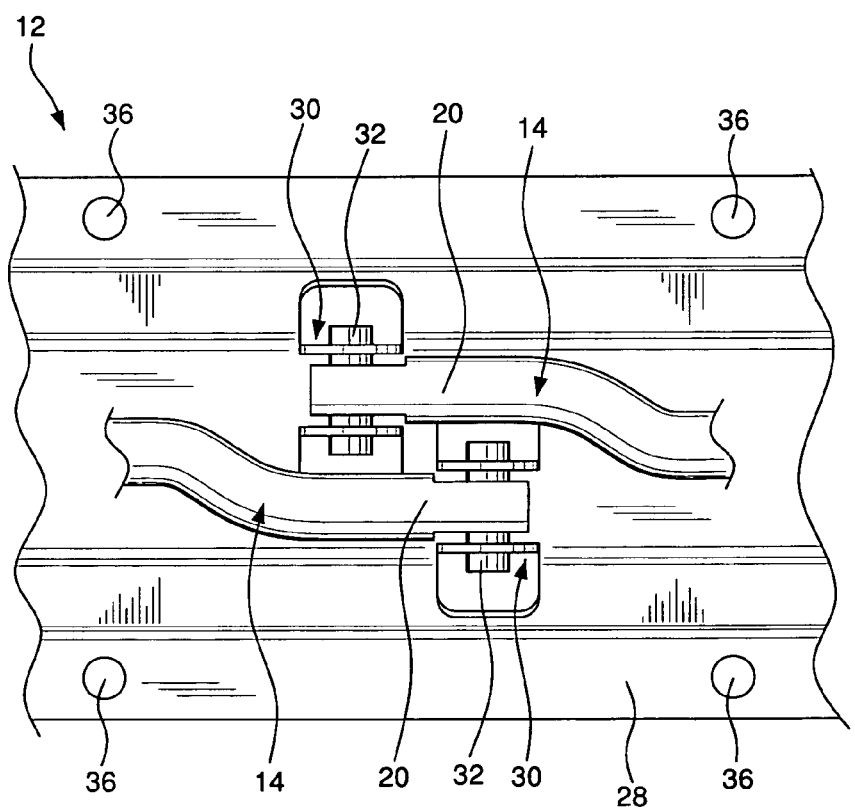
FIG. 3 is an enlarged top plan view of the base of the wheel assembly shown in FIG. 1.

As shown in FIGS. 1 and 3, the second ends 20 of the axles 14 are pivotally connected to the bottom face 28 of the base 12, preferably, near the center of the base 12. As shown in detail in FIG. 3, the bottom face 28 of the base 12 comprises brackets 30 that are welded to the bottom face 28 of the base 12 or formed from the material of the base 12 in a punching or stamping operation. The second ends 20 of the axles 14 are preferably offset and fit within these swivel brackets 30. A bolt or pin 32, is inserted through the swivel brackets 30 and holes 23 in the axles 14. This secures the axles 14 within the brackets 30 and, as shown in FIG. 5, and allows the axles 14 to rotate 180 degrees in either direction about the bolt or pin 32 between the first, expanded position of FIG. 1 to the second, folded position of FIG. 6. One skilled in the art would recognize that other types of pivot assemblies may be used to allow the axles 14 to rotate; such as a hinge or other pivot.

The wheel assembly 10 is capable of collapsing from the first or expanded position, shown in FIG. 1 to the second or folded position, shown in FIG. 6 as follows. A user (not shown) disengages the axles 14 from the protrusions 38 by pressing the axles 14 upwardly and out from within the slots 34. The user then rotates the axles 14 toward each other; i.e., away from the bottom face 28 of the base 12. This position is shown in FIG. 5. The user then slides the wheels 16 along the axles 14 toward each other, or allows the wheels 16 to slide toward each other under the force of gravity, until the wheels 16 touch. The second or folded position is shown in FIG. 6. It is more compact than the first or expanded position, which allows the assembly 10 and product 24 that is attached to be shipped or transported more easily and cheaply.

The mechanical interference from the wheels 16 against each other and the bottom face 28 of the base 12, keeps the wheel assembly 10 in the folded position. Alternatively, the wheel assembly 10 comprises a mechanism (not shown) that locks the wheels 16 in the position shown in FIG. 6. In yet another embodiment, there are hinges (not shown) along the axles 14; preferably, half-way along the axles 14, that are capable of locking when the wheel assembly 10 is in the first position but allow a portion of the axles 14 to be folded downward; i.e., rotated toward the tires 17 in the second, folded position. In other words, the portions of the axles 14 extending from the wheels 16, shown in FIG. 6, can be folded downward.

To expand the wheel assembly 10 from the folded position to the expanded position, the user simply slides the wheels 16 toward the first ends 18 of the axles 14 (FIG. 5) and rotates the axles 14 toward the bottom face 28 of the base 12 and presses the axles 14 between the protrusions 38 in the grooves 34. Thus, the wheel assembly 10 can be quickly and easily folded and unfolded.

Even though the figures show the wheel assembly 10 changed from the expanded to the folded position and vice-versa when detached from the object 24 (FIGS. 1, 5 and 6) that is wheeled, it should be obvious to one skilled in the art that the wheel assembly 10 may be easily folded or expanded as described above, while attached to the wheeled object 24 (FIG. 4).

In another embodiment, not shown, there are multiple wheels on each axle. In another embodiment, not shown, more than two (2) axles can be provided, for example, by using two of the assemblies 10 which may include or a combined base.

Figure 7:
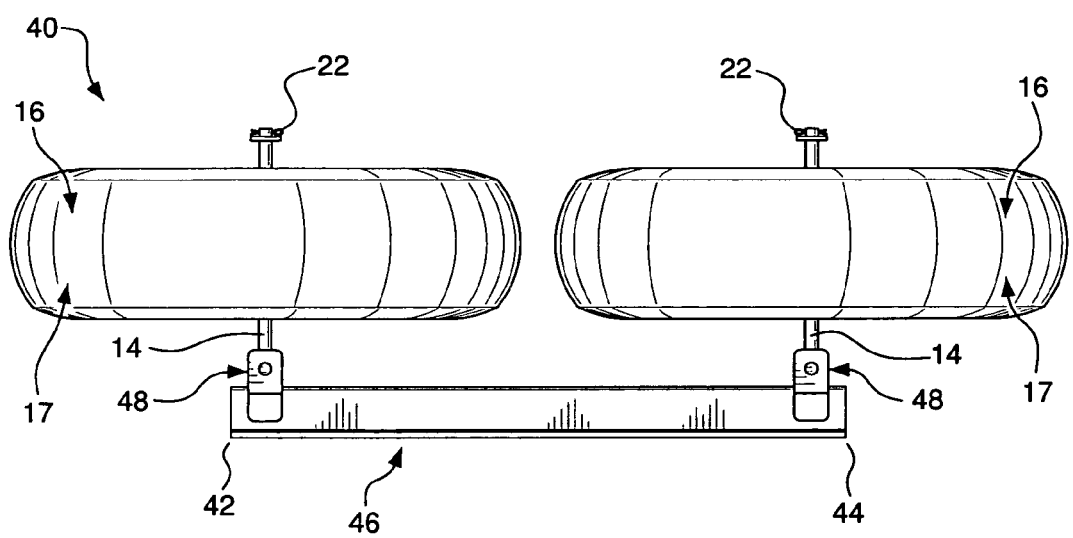
FIG. 7 is a perspective view of another embodiment of the wheel assembly of the present invention in the second or folded position.

FIG. 7 shows another embodiment of the wheel assembly 40 in the folded position. The axles 14 are spaced apart such that the wheels 16 do not contact each other in the folded position. In this embodiment, the axles 14 are shorter and are located adjacent the ends 42, 44 of the base 46 and pivot via brackets 48 to a ninety-degree (90°) position and the wheels 16 slide toward the base 46 until the wheels 16 rest flat against the base 12. Thus, when in the assembly 40 is in the folded position, shown in FIG. 7, the wheels 16 are flat on the base 12 and do not contact each other.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method of using a collapsible wheel assembly, the method comprising:
    providing a collapsible wheel assembly including:
        a base,
        a plurality of wheels, and
        a plurality of axles having opposite first and second ends, the second end of each of the axles is pivotally connected to the base, each of the axles having at least one of the wheels located thereon adjacent the respective first ends of the axles such that the wheels are respectively slideable along an associated one of the axles;
    rotating the axles toward each other; and
    sliding the wheels along the length of the axles until the wheels mechanically interfere with each other.

2. The method of claim 1, wherein each of the axles are pivotally connected to a bracket on the base and moveable within a defined plane.

3. The method of claim 1, wherein the base of the collapsible wheel assembly further comprises:

first and second ends; and flanges located at the first and second ends.

4. The method of claim 3, further comprising at least one slot sized to receive one of the axles defined in each of the flanges; and the method further comprising the step of removing each of the axles from the respective slot prior to rotating the axles toward each other.

5. The method of claim 4, wherein each of the slots comprise first and second sides, each side having a protrusion configured to interfere with an axle when the axle is seated in the slot.

6. The method of claim 1, wherein the base is comprised of first and second faces, the axles being pivotally connected to the first face of the base; and the method further comprises the step of connecting an object to the first face of the base.

7. A method of using a collapsible wheel assembly, the method comprising:

providing a collapsible wheel assembly having a collapsed state and an expanded state, the wheel assembly including:

a base having first and second faces, a plurality of wheels, and a plurality of axles having opposite first and second ends, the second end of each of the axles is pivotally connected to the second face of the base, each of the axles having at least one of the wheels located thereon adjacent the respective first ends of the axles such that the wheels are respectively slideable along an associated one of the axles;

the collapsible wheel assembly is collapsed by rotating the axles toward each other and sliding the wheels along the length of the axles until the wheels mechanically interfere with each other; and the collapsible wheel assembly is expanded by rotating the axles away from each other and sliding the wheels along the length of the axles toward the first end of each axle.

8. The method of claim 7, wherein each of the axles are pivotally connected to a bracket on the base and moveable within a defined plane.

9. The method of claim 7, wherein the base of the collapsible wheel assembly further comprises:

first and second ends; and flanges located at the first and second ends.

10. The method of claim 9, further comprising at least one slot sized to receive one of the axles defined in each of the flanges; and the method further comprising the step of removing each of the axles from the respective slot prior to rotating the axles toward each other.

11. The method of claim 10, wherein each of the slots comprise first and second sides, each side having a protrusion configured to interfere with an axle when the axle is seated in the slot.

12. The method of claim 7, wherein the method further comprises the step of connecting an object to the first face of the base.

* * * * *